Aug. 22, 1939.   C. SAUZEDDE   2,170,575
BRAKING SYSTEM
Filed April 17, 1937   2 Sheets-Sheet 1
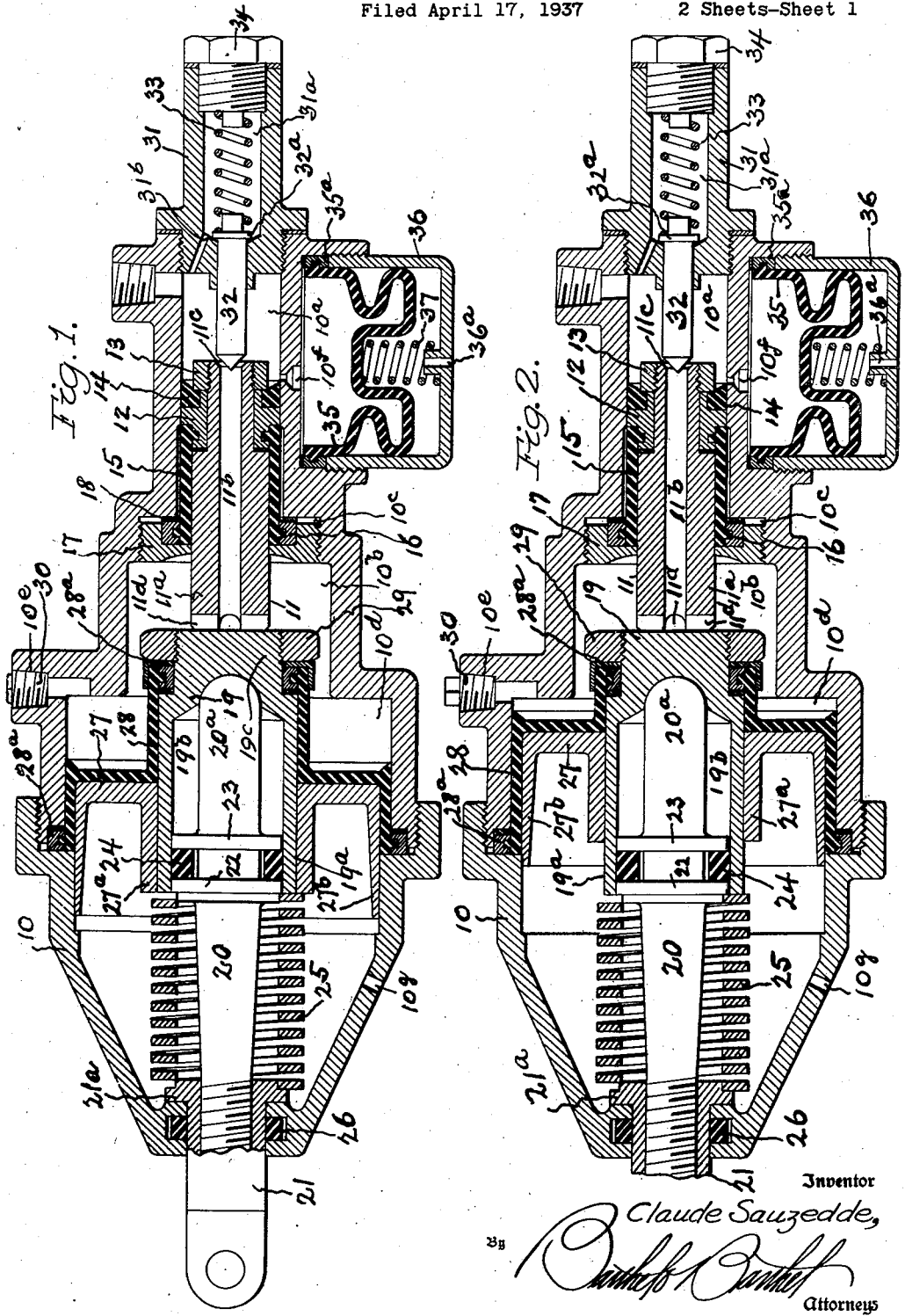
Inventor
Claude Sauzedde,
By
Attorneys Aug. 22, 1939.   C. SAUZEDDE   2,170,575
BRAKING SYSTEM
Filed April 17, 1937   2 Sheets-Sheet 2
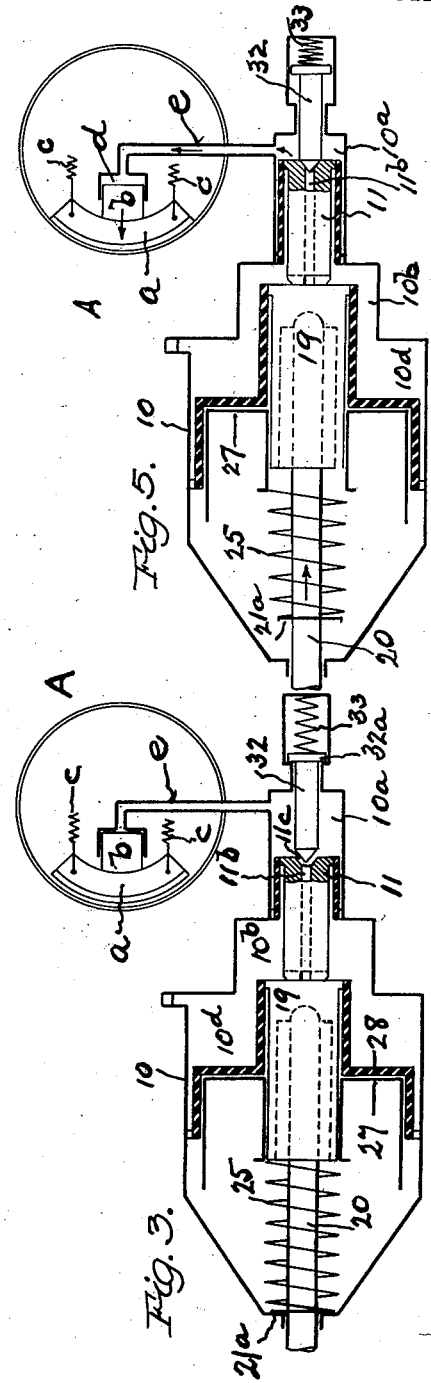
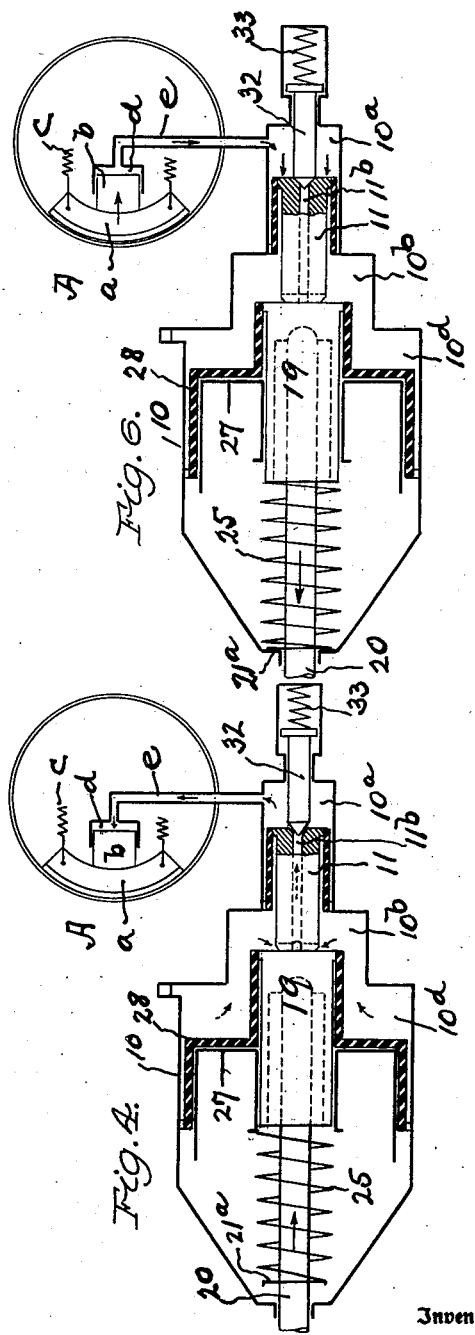
Inventor
Claude Sauzedde,
By
Attorneys Patented Aug. 22, 1939

2,170,575

UNITED STATES PATENT OFFICE 2,170,575

BRAKING SYSTEM

Claude Sauzedde, Detroit, Mich., assignor to Detroit Hydrostatic Brake Corporation, Detroit, Mich., a corporation of Michigan Application April 17, 1937, Serial No. 137,580

21 Claims. (Cl. 188—152)

This invention relates to braking systems of the hydraulic or hydrostatic type, wherein the brake application is provided through the medium of an incompressible fluid which serves to operatively connect the applying power with the point of pressure application located at the point of brake application. The system pertains generally to meeting the general conditions of system service, and more particularly to the means for producing the power application and the action of the power in the zone of the brake mechanism per se.

Brake mechanism systems employing fluid pressure in applying the brakes are well-known, particularly in automotive and like services where the use of brakes is essential, the mobility of the fluid offering a ready means for transferring the power to the mechanism. Well-known brands of such fluids are generally used, but while these are efficient for some types of service, certain difficulties are present when attempts are made to apply them to all conditions of service. For instance, such fluids tend to congeal or freeze at approximately —20° F., and to boil and vaporize at approximately 200° F., the alcohol content tending to reduce the boiling temperature value. In the prevailing practice of long-distance travel of the automobile, the wide temperature ranges encountered can readily reach the lower limit referred to, and thus affect the efficiency of the fluid for the purpose. Again, the comparatively low boiling point of the fluid may serve as a limiting factor with respect to the possible brake-pounds pressure that may be available under certain operating conditions; where this pressure is designedly high, it is possible that frequent brake applications may develop heat conditions in the mechanism such as will raise the temperature of the fluid above such low boiling point, in which case the consequent vaporization tendency would affect the operation of the system; because of this the low boiling point of the fluid can tend to limit use of systems of this type to the lower ranges of brake-pounds pressures, and thus prevent its applicability to services where the higher ranges of brake-pounds pressure are essential to meet service conditions.

I have found that by the use of a particular type of fluid, the normal range between the two limits can be largely increased; for instance, the fluid in question has its freezing point at approximately —58° F., while the boiling point is approximately 430° F., a range which brings the lower limit well within the conditions of severe service conditions, while the upper limit is so high that even under brake-pounds pressure of a relatively high value, the heating conditions under frequent brake application will not raise the fluid temperature to its upper limit. The fluid in question is a carbon carbide derivative, the ingredients of which have been employed in the dry-cleaning art, with one of the ingredients of the ethylene glycol type, the ingredients being selected to set up temperature ranges such as indicated.

The fluid, however, is of low volatility and of hygroscopic characteristic, being especially affected by moisture conditions, and affected by the hydrogen content of air; the fluid is capable of absorbing practically five times its volume in air with consequent deterioration, thus resulting in affecting the braking system operation through its variation in volume, a reason for its non-use with systems in general use. To employ the fluid in question it is essential that the system itself be sealed against any possible entrance of air—in other words, a completely-closed system—and one of the fundamental purposes of the present invention is the production of a system of the latter type; however, it will be understood, that the invention is not limited to the use of this particular fluid, since other fluids can be used as at present.

Another condition that is present in braking systems generally is brought about by the wear of the brakes or of brake linings. The non-rotating portion of the brake mechanism, when inactive and in position of repose, is generally spaced from the complemental braking surface, so that there is more or less of a "slack" zone which is initially taken up when applying the brakes, the actual resistance coming when contact is first had between the opposing faces—the brake-pounds pressure is developed by the continuance of the power after such contact has been had. It is obvious, of course, that if wear develops, contact is delayed due to the increase in the amount of slack; when this occurs, the volume of fluid may be insufficient to develop the desired brake-pounds pressure. Different ways of meeting this condition have heretofore been contemplated, as by stage action with one of the stages being used simply to take up the slack, any excess fluid being transferred to a separate chamber, thus requiring specific control conditions in addition to a somewhat cumbersome structure. The present invention is designed to provide an automatic compensation for wear of braking surfaces and variations in the slack value without transfer of fluid from its normal reserve or storage chamber, the latter carrying an amount of fluid sufficient to compensate for maximum wear conditions.

Another and highly important condition that is present in braking systems is the question of the adjustment of parts, etc. Wear of brake shoes; loss of fluid by leakage due to high pressures; expansion and contraction of fluid under temperature conditions, are but a few of the various conditions which are possible with braking systems of the hydraulic type—others will be referred to hereinafter. Whenever present compensating action must be provided to maintain the efficiency of a system, and this has required periodical adjustment of parts to meet the changed conditions set up—thus producing the compensation. In the present system the compensations are made automatically, with the arrangements such that each brake application itself sets up the characteristics of a testing period such as will permit the detection of the need of compensation, and provide for an immediate automatic response to such need, if present. As a result, the conditions are not permitted to accumulate as detrimentals, but are corrected in infancy while they are of minor value, this being made possible by the use of detecting means of a comparatively sensitive nature. One of the important advantages resulting from this is the fact that the volume of fluid used within the active fluid space of the system is maintained uniform as to volume and remains constant, so that the same conditions for service application are present with each brake application. This is true whether the fluid used is of the usual or of the special and preferred form referred to above.

In the present system the fluid space is completely sealed, thus preventing leakage from the system as well as leakage of air into the system, thus forming a completely closed system. The use of such a system is made possible by the presence of an automatic fluid control unit which forms no part of the flow-path of the fluid or the fluid space which is active during brake application, but which is brought into open communication with such flow-path when the operating parts are in repose, to thereby permit or cause compensation for any variations in the volume of fluid within the flow path which may be due to temperature or other changes in fluid volume, to thereby maintain uniformity in volume and its constancy of volume within the active portion of the fluid space of the system active for purposes of brake application.

Other advantageous results present in the invention are the simplicity of construction, efficiency in operation, durability, relatively small dimensions, sturdiness, and a comparatively low cost of manufacture.

To these and other ends, therefore, the nature of which will be made apparent as the invention is hereinafter disclosed, said invention consists in the improved construction and combinations of parts hereinafter more particularly described in the specification, illustrated in the accompanying drawings, and more particularly pointed out in the appended claims.

In the accompanying drawings, in which similar reference characters indicate similar parts in the several views, Figure 1 is a central longitudinal sectional view of an actuator employed in the present system, the parts being shown in their positions when the system is inactive with the parts in positions of repose.

Figure 2 is a similar view with the parts in the positions assumed during one of the stages of the operation.

Figures 3 to 6 are diagrammatic views of the system, illustrating various stages in the operation, Fig. 3 indicating the positions of parts in the inactive position (the position of Fig. 1); Fig. 4 shows a position of the parts during the period of taking up the "slack"; Fig. 5 shows a position of the parts in one of the brake-set positions, with Fig. 6 showing the parts during the return stroke, and corresponding somewhat to the position of Fig. 2.

The brake mechanism per se may be of preferred type, that shown at A in Figs. 3 to 6 being diagrammatic of the general type disclosed in a number of prior patents granted to me, as indicated, for instance in Patent No. 2,008,728, July 23, 1935, employing a plurality of brake-shoe elements each movable radially toward the braking surface by the movement of corresponding pistons, the latter being actuated by fluid pressure, the several shoes being connected by springs which serve to move the shoes to inactive position, the mechanism being mounted within the hub of the wheel. In the views, but one of the shoes is shown. Actually the mechanism may be of the brake drum type, with the expanding element operated by fluid pressure. In Figs. 3 to 6, the brake shoe is indicated at $a$; the piston at $b$; the springs at $c$; the fluid receiving chamber at $d$ and a connection leading to the latter at $e$. In Fig. 3, the shoe is shown as spaced from the braking surface, thus setting up the conditions of "slack", while in the remainder of these views the shoe is shown in contact with the braking surface or en route to position of repose.

The brake pedal and its operating connections leading to the actuator are not disclosed herein, these being of any desired type. They are preferably arranged to provide for a comparatively large ratio of power between the pedal and the power element of the actuator—10 to 1 may be an example—so that the power being translated can be developed into the high brake-pounds pressure that is possible.

The actuator itself, is disclosed in detail in Figs. 1 and 2, and is designed to translate the power actuation through a two-stage development. For instance, during the period of taking up the "slack", the resistance to the power being applied is provided mainly by the spring $c$, thus requiring little power to move the brake shoes into contact; consequently, a surface of large area can be utilized in providing the fluid movement to chamber $d$ to shift the piston $b$ and bring the shoes $a$ into contact relationship with the braking surfaces. When the latter contact is had, the resistance becomes very high, and to meet the changed conditions, the large area is rendered inactive, and a small area surface—also active during the first stage—alone remains active to provide the setting pressure. During the first stage, therefore, a major portion of the fluid needed is quickly moved into connection $e$ en route to chamber $d$, while during the second stage, the volume delivered to the connections is relatively small. During the return stroke the action in general is the reverse of that indicated, a variation therein being provided in that the smaller area (which was active in both stages of the advance) returns to its initial position before the large area surface begins its return to that position.

Referring first to Fig. 1, 10 indicates a casing, formed of several parts connected together, these presenting a number of internal diameters forming a number of connected chambers differing as to diameter, as shown; these are designed to receive mechanism parts used in the operations. These chambers have a common axis in that the axes are in alinement, with the connection e leading to the smaller chamber 10$^a$ which is referred to herein as the high-pressure chamber. This chamber receives a piston 11, made up of a body 11$^a$, bored axially, as at 11$^b$, and carrying at its forward end zone a piston head 12 which co-operates with the cylindrical wall of chamber 10$^a$, the head being shown as mounted on a reduced portion of body 11, and held in position by a nut 13. The forward end of the bore 11$^b$ is formed as a valve seat 11$^c$, presently referred to. The rear end of body 11 is formed with a number of radial openings 11$^d$, these being designed to afford open communication between chamber 10$^b$, in rear of chamber 10$^a$, and bore 11$^b$.

With a view to avoiding leakage the head 12 is provided with a packing element 14 on its advance side, and is itself connected with an annular sealing member 15 of resilient characteristic and which encircles body 11$^a$ and has its opposite end connected to an annular metallic member 16, mounted in an element 17 peripherally threaded to the threaded wall of a chamber 10$^c$ itself present intermediate chambers 10$^a$ and 10$^b$ positionally as well as in diameter dimension; the member 16 is itself sealed relative to a radial wall between chambers 10$^a$ and 10$^b$, by a gasket or other packing 18. Obviously, the rear end of member 15 will remain fixed in position, with the member elongating during advancing movements of the head 12, thus sealing chamber 10$^b$ from chamber 10$^a$.

The rear end of piston 11 rests against the advance end face of a member 19 which serves a number of purposes; this condition is due to the fact that the fluid in advance of piston 11 is under the pressure of the springs in the braking zone whenever the brake shoes are away from their positions of repose—in the latter position of the shoes the piston 11 is also in its position of repose. Member 19 is of extended length and includes a peripheral surface 19$^a$ of enlarged diameter to form a slideway for the low pressure piston presently described. The member also is bored from its rear end to provide a recess 19$^b$, the forward wall of which is shaped to receive and form a seat for the forward end 20$^a$ of the actuating rod 20, the rear end of which has a threaded connection with an element 21 which extends through the rear end of casing 10. Rod 20 carries a pair of annular collars 22 and 23, between which is positioned a sealing member 24. Collars 22 and 23 loosely fit within the wall of recess 19$^b$, it being understood that during operation there is no material relative axial movement between rod 20 and member 19, these parts operating substantially as a unit.

The rear end of element 21 is fashioned to be operatively connected to the connections between the pedal and the actuator, so that as the pedal is moved in one direction the element 21 is advanced, the element returning when the pedal moves in the opposite direction. Since rod 20 is threaded thereto, the movements of element 21 in the advancing direction will also cause member 19 to advance, and since piston 11 is in contact with the latter, the advancing movement will also be transmitted to piston 11. Element 21 has its inner end within casing 10 and is provided with a collar 21$^a$ which forms a stop to limit the returning movement of the element. Collar 21$^a$ is also formed with a seat for the rear end of a power spring 25, the forward end of which abuts against the rear end of member 19, collar 22 carrying a seat for this end of the spring. Spring 25 is thus positioned between member 19 and element 21, and since these two practically move in unison, as presently explained, the spring is relatively inactive with respect to these two parts, although the spring itself may be under compression in such position. The casing carries a suitable sealing packing 26 surrounding the body of element 21.

27 indicates the low pressure piston operating in chamber 10$^d$ of the casing, this being the chamber of largest diameter. The piston 27 carries an annular boss 27$^a$ which slidingly fits on the surface 19$^a$ of the skirt of member 19; it also carries a peripheral skirt 27$^b$ which extends rearward from its advance face, the peripheral face of the skirt slidingly fitting a rear portion of the wall of chamber 10$^d$. Piston 27 is sealed from that portion of chamber 10$^d$ in advance of the piston by a sealing element 28 of resilient material, this element having a generally Z-shape in cross-section, the arrangement being such that a portion overlies the periphery of skirt 27$^b$, the forward face of the piston, and the peripheral surface 19$^a$ in advance of the piston; the ends of the element are anchored or otherwise secured to metallic members 28$^a$, the rear one of which is secured within the casing 10 external of piston 27—suitable packing being provided between the member and casing—while the forward member 28$^a$ is secured upon a seat 19$^c$ of reduced diameter in the forward zone of member 19, being held to position by a nut or other securing member 29. Due to the resilient nature of the sealing element, portions thereof may elongate as shown by a comparison of Figs. 1 and 2.

The inactive or repose position of piston 27 is indicated in Fig. 1 in which the rear end of boss 27$^a$ is in contact with the forward end of spring 25. This represents the maximum capacity of chambers 10$^b$ and 10$^d$ so far as fluid content is concerned, these two chambers forming the storage or reserve chamber for the fluid. A filling opening 10$^e$ leads into chamber 10$^d$, this opening being normally closed by a suitable closure 30. The content of these chambers can reach chamber 10$^a$ through openings 11$^d$ and bore 11$^b$, when the advance end of the bore is open.

The advance end of chamber 10$^a$ is closed by a valve-carrying element 31 in the form of a fitting threaded into the bore which provides the wall of this chamber, and which carries a flange abutting the forward end of the casing with a packing gasket therebetween. The fitting 31 is formed with a bore 31$^a$ leading inwardly from its forward end toward its rear zone, the latter zone carrying an opening for the passage of a valve 32, the rear or exposed end of which is adapted to co-operate with valve seat 11$^c$ at certain times. The valve 32 carries a collar 32$^a$ located within the bore, this collar limiting the rearward movement of the valve under the action of a spring 33 located between it and a threaded plug 34 which closes the advance end of bore 31$^a$, suitable packing being employed for the plug. The collar is so positioned that when piston 11 is in its inactive or repose position the tapered end of the valve is spaced from its seat, thus causing open communication between bore 11<sup>b</sup> of the piston and chamber 10<sup>a</sup> whenever piston 11 is in its repose or inactive position. When the piston is advanced, it causes the seat 11<sup>c</sup> to approach and contact the tapered end of valve 32 after which further advance of the piston takes place with the valve in contact with its seat excepting as described presently. In other words, the valve 32 can become active with its seat after the piston 11 has advanced a distance to close the space shown therebetween in Fig. 1, movement of the valve with the piston being against the tension of spring 33.

In addition, the rear end zone of fitting 31 is provided with a port 31<sup>b</sup> which provides open communication between bore 31<sup>a</sup> and the interior of chamber 10<sup>a</sup>. This port permits transfer of fluid when necessary to enable valve 32 to have its movements. In addition it opens up the content of the bore 31<sup>a</sup> to the pressures which may develop in chamber 10<sup>a</sup>.

The casing also carries a control unit in the form of an expansible and contractible container 35, this being shown as a resilient sac-like element mounted with relation to chamber 10<sup>a</sup> and communicating with the latter through a port 10<sup>f</sup> of the casing. As indicated, the element 35 has the wall of its open end secured to a metallic annular member 35<sup>a</sup>, itself held to position in suitable manner, as by a cover or cap 36, the latter being ported to the atmosphere, as at 36<sup>a</sup>. A spring 37 may be mounted between the element and the cover or cap 36. The cap 36 and spring 37 may be omitted, if desired, in which case the member 35<sup>a</sup> would be held in position by a simple annular ring.

The control unit is designed to maintain the fluid in the fluid flow path constant as to volume, and for this purpose is rendered active with chamber 10<sup>a</sup> intermittently, by control of port 10<sup>f</sup>, the latter being positioned so as to be uncovered by the piston 11 when the latter is in its position of repose so that member 14 lies just to the rear of the port 10<sup>f</sup> when the piston is in this position; advance of piston 11 closes port 10<sup>f</sup>, thus closing off communication with the unit until the piston again reaches its inactive or repose position.

The casing 10 is also provided with a vent 10<sup>g</sup> affording access of air to the interior of the casing in rear of member 19 and piston 27 to ensure freedom in operation of these parts in service. The sealing member or element 28 will prevent access of air from this zone to the fluid.

*Operation*

The inactive position or position of repose of the system is shown in Figs. 3 and 1. In this position the brake shoes are in their positions of repose due to the action of springs c, thus setting up the conditions of "slack" referred to, the pistons b being in their inner positions with chamber d having its least content of fluid. Piston 11 is in its rear position, thus opening bore 11<sup>b</sup> to chamber 10<sup>a</sup>; member 14 is in rear of port 10<sup>f</sup> so that chamber 10<sup>a</sup> is in open communication with control unit 35. Piston 27 is in its rear position. Consequently, chambers 10<sup>d</sup> and 10<sup>b</sup> are in their maximum capacity condition, with chamber 10<sup>b</sup> in open communication with chamber 10<sup>a</sup> through bore 11<sup>b</sup> (valve 32 being in open position); since chamber 10<sup>a</sup> is in permanently open relation to connections e and chamber d, the entire fluid space or flow path is in open communication, and is filled with fluid. With port 10<sup>f</sup> open, the interior of the control unit 35 is also open to this fluid content, as is the interior of member 31. Unit 35 will be active to prevent any vacuum conditions within the fluid space or flow-path, the unit serving as a means for supplying any deficiency of fluid that may result through contraction of fluid due to severe cold weather, or to receive any excess in volume that may be present through fluid expansion due to hot weather or other temperature conditions. In other words, the fluid space will be filled to its volumetric capacity. Since port 10<sup>f</sup> closes almost immediately following the start of piston advance, and as the port forms the only outlet or inlet to the active fluid space or flow-path of the fluid, it can be understood that the volume of fluid that is active in the operation of the system is uniform at all times, any variation in uniformity in this respect being corrected automatically each time the brake mechanism and brake pedal are rendered inactive. Excepting to substitute a new supply of brake linings, or the like for those worn out, the system requires no adjustment of any kind throughout its life of service any compensations needed being provided automatically.

In addition to the above conditions spring 25, although of greater power than the springs c, is inactive, being held between collar 21<sup>a</sup> and collar 22, both of which form parts of the rod unit 20, 21. Since the pedal is also in its inactive position, all parts of the system are in their positions of repose, with the fluid space completely filled, and ready for instant action.

When the operator begins his pedal operation to apply the brakes, the reaction to the initial movement is that of advance of rod 20, with the consequent advance of member 19 and piston 11, and an almost immediate closure of the forward end of bore 11<sup>b</sup> and the closure of port 10<sup>f</sup>; hence when this point is reached, chamber 10<sup>a</sup> is closed from chamber 10<sup>b</sup> as well as from the control unit 35. During this movement the skirt of member 19 has also advanced, as has collar 22, while piston 27 is held from advance by the fluid content of the chambers 10<sup>d</sup> and 10<sup>b</sup>. As a result, the forward end of spring 25 no longer is active with member 19 and collar 22 but remains active with the rear end of boss 27<sup>a</sup>; hence, the previous inactivity of spring 25, provided by being confined by definitely positioned collars 21<sup>a</sup> and 22 of the same element, is changed to activity, since the spring is now operating with an element capable of moving relative to member 19. In other words, this change has served to place spring 25 as a power-applying element for the low pressure piston 27, with the rear end of the spring remaining co-operative with collar 21<sup>a</sup>. The spring 25 is thus subject to the advancing action of collar 21<sup>a</sup>, with its possibilities of increasing the spring power through compression, and at the same time applies this power to the low pressure piston 27.

Since piston 11 cannot advance without displacing fluid from chamber 10<sup>a</sup>—and valve 32 is in its closed position at this time to prevent fluid from chamber 10<sup>a</sup> passing into the chamber 10<sup>b</sup>—the displaced fluid must pass into the connections e and into chamber d, thus moving piston b to take the shoe a from its position of repose in the direction of its position of contact with the braking surface, and in this movement correspondingly increasing the tension of springs c, since the latter are then in opposition to the power being applied from the pedal.

With spring 25 thus made active as a power source for the low pressure piston 27 by the advance of rod 20 and member 19, the power of spring 25—itself of greater power value than the similar value of springs c—thus becomes active in opposition to the resistance of springs c, thus providing a higher pressure in chambers 10ᵈ and 10ᵇ than is present in chamber 10ª, with the result that valve 32, which had been previously seated, is forced from its seat, thus restoring communication between chambers 10ᵇ and 10ª through bore 11ᵇ. As a result, piston 27 can advance under the superior power of spring 25, such advance displacing fluid from chamber 10ᵇ into chamber 10ª and obviously into connections e to increase the rapidity of advance of piston b through the addition of fluid to chamber d.

This advance of piston 27 will continue as long as the superiority of power remains with spring 25, so that until conditions become changed in the brake mechanism, this conjoint action of pistons 27 and 11 will continue, it being understood that the power being applied to the brake pedal is continuing the advance of rod 20 during this period.

While the volume of fluid which is being added to the connections e is made up of content from chambers 10ª and 10ᵇ—due to the advance of both pistons—the major portion of this addition is being supplied from chamber 10ᵇ. Actually, the volume of fluid that is being added comes entirely from chambers 10ᵈ and 10ᵇ—the reserve chamber—since the fluid that is being displaced from chamber 10ª by the advance of piston 11, is simply a displaced fluid normally present in chamber 10ª, the fluid from the reserve chamber being added to that of chamber 10ª to supply the volume needed to meet the conditions during this period while the superiority of power of spring 25 remains active. This superiority of power of spring 25 ends when shoe a contacts the braking surface, thus suddenly increasing the resistance which had been previously limited to the power of springs c. In other words, this superiority of the power of spring 25 remains active during the period of taking up the "slack" in the brake shoe advance, and since the area of piston 27 is large, the supply of the added fluid is made with rapidity and without requiring excessive movement of the brake pedal.

Obviously, the amount of this added volume of fluid will depend upon the amount of "slack" that is present in the brake mechanism. If the brake linings, etc., are unworn, the amount of slack would be that usually provided in brake mechanisms to ensure that the shoes will not be active to develop friction when the shoes are in position of repose. Since the position of repose of the shoes remains constant, the amount of the fluid to be added to chamber 10ª will depend upon the particular status of the parts as to wear at the time the brake application takes place. For instance, a comparison of the positions of the piston 27 in Figs. 2 and 5, can indicate the possible effects of wear; these two views indicate possible positions of advance of piston 27 at the instant of contact of shoe and braking surface. In Fig. 5, the brake linings, etc., may be considered as having had little or no wear, while in Fig. 2 the wear has been complete; hence, in the latter case, the amount of "slack" has been largely increased, with the result that a greater volume of fluid has been added to the content of chamber 10ª in the latter instance, a result obtained by a greater advance of the low pressure piston 27, as indicated in Fig. 2.

When the shoes a reach such contacting positions with the braking surfaces, the conditions change, due to the fact that the resistance is suddenly increased to a high value. This resistance becomes manifest in chamber 10ª through the effect set up in connections e and in the chamber of fitting 31, thus permitting spring 33 to become active to close valve 32. The presence of this high resistance in chamber 10ª obviously was made manifest on the content of the reserve chamber and on piston 27, and since spring 25 has not the power to overcome this resistance, piston 27 ends its advance. With the closing of valve 32, the volume of fluid which had been active as a unit previously, is segregated into two increments, that which is in advance of piston 11 remaining active, while the increment which remains in chambers 10ᵈ and 10ᵇ and in bore 11ᵇ becomes an inactive reserve. The total volume of fluid is not changed, but such volume has temporarily taken on the status of an active increment and a reserve increment, with the actual individual volume value found in the separate increments dependent upon the conditions of wear, etc., present in the brake mechanism itself.

The parts are shown diagrammatically during this period in Fig. 4, this view indicating a position during which spring 25 is active to advance the low pressure piston 27. Presumably the pedal will be continuing its movement during the period, thus advancing piston 11, collar 22 and member 19, so that the active status of spring 25 will remain constant until the resistance is suddenly increased as stated above. The resistance to advance is greater in connection with piston 27, but since advance of rod 22 will also advance collar 21ª, the power of spring 25 will be increased if piston 11 be given a more rapid advance.

When the sudden increase in resistance occurs with the resultant end of advance of the low pressure piston and closing of valve 32, the continued advance of the pedal sets the brakes by the further advance of piston 11, the latter being of relatively small area permitting the pedal power to be made efficiently active for the purpose, the increment of fluid in advance of the piston being active as the mobile piston during the brake setting period. Valve 32 advances with the piston thus retaining the active increment separate from the reserve fluid, with the pedal pressure directly active on the high-pressure piston of relatively small diameter.

From the above, several characteristics will be noted. The brake pedal acts directly only upon the high-pressure piston 11, the low pressure piston 27 being acted upon only indirectly by the pedal through spring 25 which can yield in presence of superior resistance. The volume of fluid remains constant in volume so far as fluid in service is concerned, but the volume becomes divided into two portions or increments by closure of valve 32, so that but a portion of the total volume remains active in setting the brakes, the inactive fluid increment remaining with the chambers 10ᵈ, 10ᵇ which chambers thus serve as a compensating reserve chamber from which the fluid for taking up the "slack" is supplied with each brake application, being returned to the chamber for re-use during the succeeding brake-release operation as presently described; hence, the "slack" requirements determine the extent of advance of the low pressure piston; the volume of fluid present is sufficient to meet maximum "slack" conditions. The indirect power application applied to the low pressure piston by spring 25, provides for compensation within the chambers 10d, 10b, during the second-stage advance of the high pressure piston; with the superiority in resistance present in this stage and made manifest through chamber 10a, the displacement set up by the continued advance of member 19 into chamber 10b is met by the ability of the low pressure piston to yield to permit chamber 10d to receive the displaced fluid; the content of chambers 10d, 10b is therefore under the pressure of spring 25 acting at its maximum compression value for the operation, while the content of chamber 10a is under the pressure value set by the resistance set up by the opposing braking surfaces in contact. The extent of advance of the low pressure piston is variable and dependent upon the "slack" requirements; the low pressure chamber thus constantly remains as the reserve chamber at all times, the percentage discharged therefrom being automatically determined by the "slack" requirements, the residue being segregated from the fluid active in brake setting, with such residue remaining in its storage location; consequently, sealing conditions remain constant with respect to the reserve chamber fluid, and the residue is not required to be transferred from point to point—only the percentage segregated for active service is temporarily taken from the reserve supply for the individual braking operation.
With the system in "brake-set" condition, springs 25, c and 33 are in the maximum increased-energy status for the particular braking action that is being had. Spring 25 has its rear end contacting collar 21a and its forward end contacting the boss 27a of piston 27, and therefore under compression; springs c are tensioned by the movement of the brake shoes to the brake-set position; and spring 33 is under compression through the movement of valve 32 produced by the advance of piston 11. Consequently, release of the brake pedal—the source which produced the increase-energy effect on the springs—releases the springs from restraint, to permit immediate response to the pedal releasing action.
As is apparent from the previous description of the brake-applying operation, springs c and 33 are acting in opposition to spring 25 and the pedal power during such operation, these springs c and 33 resisting the power during the advance of the pistons. When, however, the brake pedal is released, each of the springs—25, c and 33—immediately act in the direction of their positions of repose, springs c and 25 co-operating to return piston 11, member 19, rod 20, member 21, and the pedal to their positions of repose, being aided in this by the usual pedal spring; spring 33 is active to cause valve 32 to remain seated on its piston seat until the valve position of repose is reached, the further movement of the piston, etc., moving seat 11c from contact with the valve to thereby again open communication between bore 11b and chamber 10a. Hence, the retracting movements of piston 11, member 19, rod 20, member 21 and the pedal, follow immediately as the inherent reaction to the pedal release, the movements being with such rapidity as to set up substantially an instantaneous response, with the latter placing these parts—with valve 32—in their positions of repose; a position such as this is presented in Fig. 2.

During this period, however, a change in status has taken place with respect to spring 25. As indicated, for instance, in Fig. 5, the brake-set position of the parts has placed the rear end of the skirt of member 19—together with collar 22 forward of and spaced from the front end of spring 25, the latter contacting the rear end of boss 27a—the condition which rendered spring 25 active as a power source. This activity will remain until the skirt of member 19 and collar 22 again contact the forward end of spring 25, so that during the earlier part of the return movement of member 19 and collar 22 this power remains active to retain the low pressure piston in its advance position, valve 32 being closed during this period; consequently, the power of springs c is being made active only in chamber 10a with a consequent rapid shift of piston 11 to its position of repose. As will be understood, the fact that spring 25 is acting to resist return of piston 27 during this early period ensures that piston 27 will not return accidentally with member 19 during the period, thus avoiding any possibility of setting up a tendency to production of a vacuum in the reserve chamber.
When, however, the return movement of member 19 and rod 20 brings the rear end of the skirt of member 19 and collar 22 into contact with the forward end of spring 25, the latter becomes inactive, through the fact that it then becomes positioned between the two collars 21a and 22, and incapable of further expansion. When this occurs, further return movement of the parts referred to simply carries spring 25 with the rod 20, leaving the low pressure piston 27 as unaffected by spring 25 and therefore simply a floating piston—Figs. 2 and 6 present the effect set up as to the relation of piston 27 with spring 25 at the time when piston 11 and its operating parts have returned to their positions of repose.
While spring 25 is thus rendered inactive and frees piston 27 from the power effect of the spring, springs c remain active, and since the valve-controlled entrance to bore 11b has now been opened, the fact that piston 11 has reached its position of repose and thus established the maximum dimensions of chamber 10a, does not affect the action of springs c since communication with chamber 10b has now been restored, and the fluid can return to the reserve chamber through bore 11b, piston 27, which has become floating, presenting no material resistance to such movement of the fluid until the rear end of boss 27a again contacts with spring 25.
Hence, until valve 32 reaches its position of repose, piston 27 remains in its advance position, beginning its return movement only when the continued returning movement of piston 11 opens the entrance to bore 11b. Since the opening of this entrance comes only when piston 11 is in the immediate vicinity of its position of repose, it can be understood that in the return operation of the parts of the system a two-stage action also is present, the stages, however, being practically individual to the pistons themselves, thus distinguishing from the two-stage conditions of the parts advanced where the first stage has the two pistons operating concurrently. Obviously, with piston 27 either subject to the power of spring 25 during the earlier part of the first stage, or is actually floating, as in the remainder of the first stage, any shifting of fluid within the reserve chamber due to the returning movement of member 19, will not set up any tendency in the direction of vacuum conditions within the chamber, since piston 27 is free to make compensating movements.

With port 10ᶠ also opening, through the movement of piston 11 to its position of repose, it will be understood that if the volume of fluid has been temporarily increased by heat, the positioning of piston 27 in contact with spring 25 to establish its position of repose will cause the increase to become manifest, and the excess fluid would then pass into unit 35. On the other hand, if the volume has been temporarily decreased by fluid contraction due to temperature conditions, piston 27 would not completely pass to its position of repose and would thus remain floating, in which case unit 35 would become active to add a sufficient amount of fluid to return piston 27 to its position of repose. Since this possibility of varying the volume of the flow path of the fluid takes place each time the brakes are operated, assurance is had that the volume of fluid within the flow path of the system will remain constant, since the flow path content is automatically subjected to the correcting measures when change from normal is detected, with the tests presented each time the brake is operated; consequently, the system is always at its most efficient status and with an assurance that the volume of fluid of the flow path is constant and uniform as to volume for successive operations. The percentage of fluid which may actually be active in the flow path may vary due to wear of brake surfaces, etc., but at the close of the braking cycle such percentage has been reunited to the reserve chamber residue to again complete the constant volume.

As will be seen, the brake-release action, like that of the brake-setting action, is of the two-stage type; the stages, however, are not simple reversals. During the brake-setting period, the initial stage presents the condition of both pistons operating concurrently during the low pressure operation period of taking up the "slack", after which piston 11 alone remains active, and operating as the second or high pressure stage. During the brake-release period, the two pistons move more on the basis of individuals, the piston 11 moving to its position of repose, followed by the movement of piston 27—any overlapping of the two movements being incidental and being immaterial; the stages thus are more or less individual to the two pistons. This permits of the ready detection of the presence of a change in volume in the flow-path—the latter being considered as the complete fluid space with the exception of the space within unit 35—and immediate correction of the conditions as above indicated.

From the above a number of advantageous conditions will be apparent.

Whether or not the special fluid referred to is employed, it will be seen that the system, in operation, requires no adjustment manually, periodic or otherwise, all adjustments that may be necessary being automatic and taking place when the need is detected; after the system has been prepared for service, the only matter needing possible attention is that of replacing worn-out brake linings; wear of the latter is ineffective to change the operation to any material extent, the arrangement being such as will permit the lining to become completely worn before replacement is needed. Temperature conditions, whether due to weather or to operating conditions, do not change these conditions of freedom from manual adjustment, since unit 35 is active to detect and correct any changed conditions each time the brakes are operated; this individual and constant testing of conditions is of advantage through the fact that corrections can be made instantly and are generally small, enabling the use of a sensitive detector, with the result that changed conditions do not become accumulative before being remedied—an accumulated effect may be set up over an extended period, but the effect is made manifest in the unit 35 instead of within the flow path.

An adequate reserve chamber can be utilized with assurance that the supply of fluid will meet all conditions of service. The reserve fluid is undisturbed excepting as to the percentage being used to take up the "slack", so that it is possible to seal the chamber against the entrance of air to the fluid, a condition not possible where displacement from the chamber of a part or all of the residue of fluid must be had to permit the system to operate, since the displacement takes fluid from the chamber and this must be returned preparatory to the succeeding braking operation, a condition which practically opens up the fluid to contact with the air.

The system utilizes but one controlling valve —valve 32—the operations of which are automatic. The adjustments are made at the time of installation or initial check, after which the system is self-compensating under conditions of wear, temperature changes, etc., with an assurance that the cyclar action of a brake application will be the same with all brake applications, although wear may set up variations as to percentage of fluid taken from the reserve during low pressure activity with possible variation as to the time length of the low pressure stage. Obviously, where wear of brake linings has developed a considerable slack the length of advance of piston 11 during the low pressure stage will be increased and thus affect the dimensions of chamber 10ᵃ at the beginning of the high-pressure stage, but this fact does not change the operation, ample dimensions of chamber 10ᵃ permitting the completion of the high-pressure stage efficiently, the operating parts all compensating for the difference.

The presence of any variations of this kind, however, does not affect the fundamental feature of the system of beginning the brake application cycle with the same amount of fluid during successive operations with the fluid filling the space of the reserve chamber and remaining flow path, and retaining this condition throughout the cycle; varying dimensions of the shaped space during the low-pressure stage without disturbing the volume of the fluid and space, and then segregating a percentage of the fluid for the high-pressure stage without materially affecting the varied space dimensions of the reserve fluid set up during the low-pressure period; the initial conditions are then restored by pedal-release activity. Hence, the fluid never leaves this space, and its volume is unchanged during the two-stage operation. This is provided with the use of the single valve, and is made possible by permitting relative movement between the high and low pressure pistons and providing a power means for the low pressure piston such as will permit its being rendered inactive at predetermined periods of the operation, and the power value of which can be varied, thus permitting the differentials in pressure on opposite sides of this piston to be active in the control of the system operation.

As will be understood, the system as an entirety presents a number of conditions that are of the greatest value in connection with brake system operation. There is no requirement of the use of self-energizing features, although the brake-pounds pressure possible is almost limitless, due to the possibility of the use of wide-ratio leverage conditions and the dimensions of parts. The brake mechanism, especially where the type is that referred to in the above-identified patent and those of generally similar types, provides for self-centering of the brake shoes, uniformity of wear of frictional surfaces, and reversibility of motion of the rotatable member of the mechanism. Positive and substantially instantaneous engagement and release actions of the system are inherent in the system. Other advantageous conditions, such as simplicity of structure, ease of manufacture, etc., are apparent and need not be referred to in detail.

While I have disclosed a preferred embodiment of the invention, it will be readily understood that changes and modifications therein may be found desirable or essential to meet various exigencies of use and the preferences of users, and I therefore reserve the right to make any and all such changes or modifications therein as may be found desirable or essential, insofar as the same fall within the spirit and scope of the invention as expressed in the following claims when broadly construed.

What I claim as new is:

1. In braking systems of the hydrostatic type, wherein the system includes a brake-applying zone and a power zone with the zones operatively connected by a fluid serving as a mobile incompressible linkage extending into both zones, and wherein the actuation of the respective mechanisms of the zones is by power from the power zone during brake-applying activities and by power from the brake-applying zone during brake-release activities, such system including fluid-operated braking mechanism in the braking zone, a fluid-actuating means in the power zone and adapted to be rendered active by manual manipulation at will, and fluid-conduit connections between said braking mechanism and said actuating means to thereby complete a fluid flow-path space for the mobile fluid linkage within the braking mechanism, the connections and said actuating means, said actuating means including mechanism for controllably moving fluid between the connections and a reserve chamber forming part of such flow-path space with the volume of fluid so moved automatically determined by the "slack" of the braking mechanism, and an automatically-operated fluid-control instrumentality operative to receive fluid from and deliver fluid to said flow-path and adapted to be rendered active with such fluid flow-path space intermittently to maintain the volume of fluid of the flow-path space constantly uniform as to volume, the fluid of the system being in open communication and under uniform pressure throughout such space when the system is in repose, whereby the system is maintained in uniform efficiency under normal service conditions automatically, said fluid space being variable as to its defining configurations during braking activity but constant as to volumetric dimensions during braking activity and inactivity.

2. A system as in claim 1 characterized in that the braking mechanism, actuating means and connections include means for sealing the fluid flow-path space against fluid leakage and air admission.

3. A system as in claim 1 characterized in that the brake-applying activity of the fluid is of two-stage type, with the entire volume of fluid of the flow-path space active during the first stage and with a percentage of such volume active during the second stage, and with the residue of the volume retained within the reserve chamber portion of such flow-path space.

4. A system as in claim 1 characterized in that the brake-applying activity of the fluid is of the two-stage type, with the entire volume of fluid of the flow-path space active during the first stage and with a percentage only of such volume active during the second stage and with the residue of fluid retained in the reserve chamber of such space during the second stage, the percentage value of the second stage being variable and determined by the "slack" of the braking mechanism.

5. A system as in claim 1 characterized in that the fluid-actuating means includes a low-pressure chamber and a high-pressure chamber connected by a controllable passageway and with the low-pressure chamber presenting the reserve chamber of the fluid flow-path space, said high-pressure chamber being permanently-open to the braking mechanism, and a control valve for the passageway automatically operative to permit communication between said chambers during low-pressure activity and to prevent such communication during the high-pressure activity of the system.

6. A system as in claim 1 characterized in that the fluid-actuating means includes a low-pressure chamber and a high-pressure chamber connected by a controllable passageway and with the low-pressure chamber presenting the reserve chamber of the fluid flow-path space, said high-pressure chamber being permanently open to the braking mechanism, and a control valve for the passageway automatically operative to permit communication between said chambers during low-pressure activity and to prevent such communication during the high-pressure activity of the system, each of said pressure chambers including a movable wall constituting a piston, the high-pressure piston being advanced directly by the manual manipulation activity with the low-pressure piston advance provided indirectly thereby through a yieldable member.

7. A system as in claim 1 characterized in that the fluid-actuating means includes a low-pressure chamber and a high-pressure chamber connected by a controllable passageway and with the low-pressure chamber presenting the reserve chamber of the fluid flow-path space, said high-pressure chamber being permanently open to the braking mechanism, and a control valve for the passageway automatically operative to permit communication between said chambers during low-pressure activity and to prevent such communication during the high-pressure activity of the system, each of said pressure chambers including a movable wall constituting a piston, the high-pressure piston being advanced directly by the manual manipulation activity and with the low-pressure piston advance provided indirectly from such manual manipulation by a manual manipulator made active on the low-pressure piston through an intermittently-active resilient member having its inactivity determined by the manual manipulator of the high-pressure piston.

8. A system as in claim 1 characterized in that the fluid-actuating means includes a low-pressure chamber and a high-pressure chamber connected by a controllable passageway and with the low-pressure chamber presenting the reserve chamber of the fluid flow-path space, said instrumentality having port communication with the high-pressure chamber with the port communication limited to periods when manual power manipulation is substantially absent.

9. A system as in claim 1 characterized in that the fluid-actuating means includes a low-pressure chamber and a high-pressure chamber connected by a controllable passageway and with the low-pressure chamber presenting the reserve chamber of the fluid flow-path, each chamber having a movable wall constituting a piston adapted to advance fluid from the chamber, said instrumentality having port communication with the high-pressure chamber with the activity of the port controlled by movements of the high-pressure piston.

10. A system as in claim 1 characterized in that the fluid-actuating means includes a low-pressure chamber and a high-pressure chamber connected by a controllable passageway and with the low-pressure chamber presenting the reserve chamber of the fluid flow-path, and a valve controlling said passageway, each of said chambers having a movable wall constituting a piston adapted to advance fluid from the chamber, said valve and high-pressure piston co-operating in the control of the passageway with the co-operation such that the valve is open when the piston is in repose, said instrumentality having a port communication with the high-pressure chamber with the port controlled by movements of the high-pressure piston with the port opened when the piston is in proximity to and in its position of repose.

11. A system as in claim 1 characterized in that the fluid-actuating means includes a low-pressure chamber and a high-pressure chamber connected by a controllable passageway and with the low-pressure chamber presenting the reserve chamber of the fluid flow-path, each chamber having a movable wall constituting a piston for advancing fluid from its chamber, said pistons being movable as individuals with the cycle of advancing movement including a period when both pistons advance concurrently followed by advance of the high-pressure piston alone and the cycle of brake-release movement having the high-pressure piston movable to its position of repose prior to movement of the low-pressure piston in the same direction, said instrumentality having port communication with the high-pressure cylinder with the port controlled by movements of the high-pressure piston and with the port positioned to be opened when the high-pressure piston is in proximity to and in its position of repose, whereby the port communication will be open when the system is in repose and will close at the beginning of piston advancing movement and with the communication restored by the return of the high-pressure piston to its position of repose during the brake-release cycle to thereby place the instrumentality active with the fluid flow-path as an active compensation agency to ensure movement of the low-pressure piston to its position of repose and preserve the volume uniformity of the fluid content of the fluid flow-path space preparatory to the succeeding brake application.

12. A system as in claim 1 characterized in that the instrumentality has open communication with the fluid flow-path space when the system is in repose and being inactive with such space during predetermined portions of the brake-applying and brake-releasing cycles of the mechanisms with the open communication extending into both cycles, the time-length of open communication with the space being materially greater in the releasing cycle than in the applying cycle of the brakes.

13. A system as in claim 1 characterised in that the instrumentality has open communication with the fluid flow-path space when the system is in repose, such communication ending during the initial period of the brake-applying activity of the fluid-actuating means to thereby determine the fluid volume of the flow-path for the instant cycle of brake-applying operation of the system, such communication being restored during the succeeding brake-release operation of the system and by fluid-actuating means activity, such restoration taking place within an intermediate zone in point of time of the activity of such means during the release cycle with the restored communication remaining unto the end of the cycle, to thereby ensure return of the means to positions of repose and to prepare the fluid volume for the succeeding brake application.

14. A system as in claim 1 characterized in that the fluid-actuating means includes a low-pressure chamber with a movable wall constituting a piston, the advancing movements of the piston operating to displace fluid within the flow-path, the actuating means being operative to provide advancing movements of the piston in presence of "slack" conditions in the brake mechanism with the extent of such advancing movements limited and determined by the fluid volume of the low pressure chamber required to compensate for taking up such slack, said instrumentality being active with the fluid flow path throughout the stroke of the piston during the return movement of the latter.

15. A system as in claim 1 characterized in that the fluid-actuating means includes a low-pressure chamber with a movable wall constituting a piston, the advancing movements of the piston operating to displace fluid within the flow-path space, the actuating means being operative to provide advancing movements of the piston in presence of "slack" conditions in the braking mechanism with the extent of such advancing movements limited and determined by the fluid volume of the low pressure chamber required to compensate for taking up such slack, said instrumentality being inactive with the fluid flow-path space during substantially the entire advancing stroke of the piston and active with such space substantially throughout the returning stroke of the piston.

16. A system as in claim 1 characterized in that the fluid-actuating means includes a high-pressure piston and a low-pressure piston movable relative to each other, said pistons being movable in a two-stage cycle in both brake-applying and brake-releasing activities of the system operation, said pistons advancing concurrently during the first stage of the brake-applying activity with the high-pressure piston alone advancing during the second stage of such brake applying activity, the two pistons moving individually in the direction of their respective positions of repose and in different stages during the brake-release activity, the instrumentality being active with the flow-path space substantially throughout the length of the stroke of the low-pressure piston during the brake-release cycle of activity.

17. A system as in claim 1 characterized in that the fluid-actuating means includes a high-pressure piston and a low-pressure piston movable relative to each other, said pistons being movable in a two-stage cycle in both brake-applying and brake-releasing activities of the system operation, said pistons advancing concurrently during the first stage of the brake applying activity with the high-pressure piston alone advancing during the second stage of such activity, the two pistons moving individually in the direction of their respective positions of repose and in different stages during the brake-releasing activity with the movement of the high-pressure piston preceding that of the low-pressure piston during such brake-releasing activity, the instrumentality being rendered active with the fluid flow-path space by the returning movement of the high-pressure piston to thereby provide open communication between the instrumentality and flow-path space substantially throughout the length of the returning stroke of the low-pressure piston.

18. A system as in claim 1 characterized in that the braking mechanism includes a braking member movable between positions of repose and of braking contact with the movement subject to spring tension, and that the fluid actuating means includes a low pressure piston operative in an advancing direction by spring means forming an element of the actuating means, the power of the spring means when active being superior to the resistance of the brake-mechanism spring tension, said spring means being permanently tensioned with the power thereof inactive when the system is in repose, the actuating means being operative to render the spring means active to advance the piston during movement of the braking member to its contact position and to thereafter render the spring means inactive to advance the piston when such contact position of the braking member is reached, the actuating means being operative during the brake-release operation of the system to temporarily break engagement of the spring means and the piston to thereby free the piston for return movement by the spring tension of the braking-mechanism.

19. A system as in claim 1 characterized in that the fluid-actuating means includes a low-pressure piston and a high-pressure piston with the high-pressure piston advance provided directly through operative connection with the manual manipulation means, said fluid-actuating means also including yieldable means operative to advance the low-pressure piston, said yieldable means being co-operative with and normally controllably restrained by such operative connection of the high-pressure piston and being rendered active with the low-pressure piston by the advance of the high-pressure piston from its position of repose.

20. A system as in claim 1 characterized in that the fluid-actuating means includes a low-pressure piston and a high-pressure piston movable relatively to each other with the high-pressure piston advance provided directly through operative connection with the manual manipulation means, said fluid-actuating means also including spring means operative to advance the low-pressure piston, said spring means being co-operative with and normally controllably restrained by such operative connection of the high-pressure piston and being rendered active with the low-pressure piston by advance of the high-pressure piston from its position of repose, said spring means being rendered inactive by such operative connection by and during returning movement of the high-pressure piston and prior to the return of the low-pressure piston to its position of repose.

21. A system as in claim 1 characterized in that the fluid-actuating means includes a high-pressure chamber and a low-pressure chamber with a wall of each constituting a piston movable from and to a position of repose, said high-pressure chamber being in permanently-open communication with the braking mechanism, said chambers being operatively connected by a controlled passageway carried by the high-pressure chamber piston, a spring-supported valve within the high-pressure chamber and adapted to be co-operative with the high-pressure chamber end of said passageway, said valve having a position of repose with the latter such as to maintain the passageway open when the high-pressure piston is in its position of repose, said valve being rendered active with the passageway by advance of the high-pressure piston from its position of repose and being subject to the pressures of the two chambers to automatically determine its activity to close the passageway when the high-pressure piston is in advanced position relative to its position of repose.

CLAUDE SAUZEDDE.